US010339965B2

(12) United States Patent
Nishimura et al.

(10) Patent No.: US 10,339,965 B2
(45) Date of Patent: Jul. 2, 2019

(54) THERMALLY ASSISTED MAGNETIC RECORDING HEAD HAVING PLASMON GENERATOR IN WHICH DIELECTRIC LAYER IS SURROUNDED BY METAL LAYER

(71) Applicant: TDK Corporation, Tokyo (JP)

(72) Inventors: Yuki Nishimura, Tokyo (JP); Norikazu Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/416,065

(22) Filed: Jan. 26, 2017

(65) Prior Publication Data

US 2018/0211686 A1   Jul. 26, 2018

(51) Int. Cl.
*G11B 5/31* (2006.01)
*G11B 5/60* (2006.01)
*G11B 5/127* (2006.01)
*G11B 5/00* (2006.01)

(52) U.S. Cl.
CPC ............ *G11B 5/314* (2013.01); *G11B 5/1278* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,233,358 B2 | 7/2012 | Zhou et al. | |
| 8,270,260 B2 | 9/2012 | Okada et al. | |
| 8,284,637 B2 | 10/2012 | Jin et al. | |
| 8,503,271 B2 | 8/2013 | Zhou et al. | |
| 8,619,513 B1 | 12/2013 | Challener et al. | |
| 9,424,866 B1* | 8/2016 | Cao et al. | G11B 5/314 |
| 9,484,051 B1* | 11/2016 | Krichevsky et al. | G11B 5/314 |
| 2010/0061018 A1* | 3/2010 | Albrecht et al. | G11B 5/314 360/135 |
| 2010/0165499 A1* | 7/2010 | Stipe | G11B 5/314 360/59 |
| 2011/0181979 A1* | 7/2011 | Jin et al. | G11B 5/314 360/59 |

FOREIGN PATENT DOCUMENTS

JP   2009-163864 A   7/2009

* cited by examiner

*Primary Examiner* — Craig A. Renner
(74) *Attorney, Agent, or Firm* — Posz Law Group, PLC

(57) ABSTRACT

A thermally assisted magnetic recording head has a waveguide that propagates laser light as propagating light; a main pole that has a first end portion on an air bearing surface (ABS) facing a magnetic recording medium and that emits a magnetic flux to the magnetic recording medium; a metal layer that is positioned between the main pole and the waveguide, that extends from a second end portion positioned on the ABS in a height direction, that generates surface plasmons from the propagating light, and that generates near-field light (NF light) from the surface plasmons at the second end portion; and a dielectric body layer that is surrounded by the metal layer and that extends from a third end portion positioned on the ABS in a height direction.

8 Claims, 14 Drawing Sheets

Fig. 8
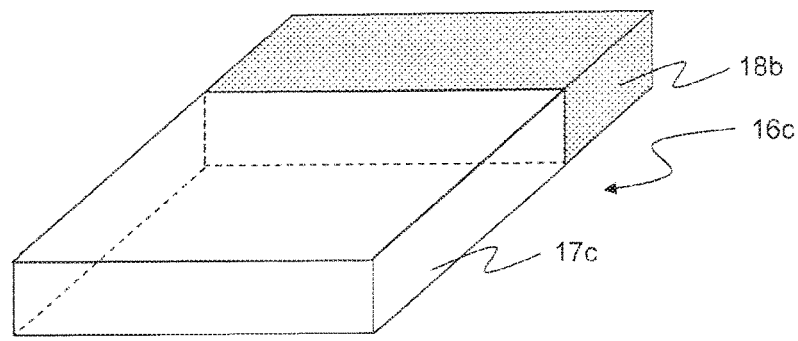
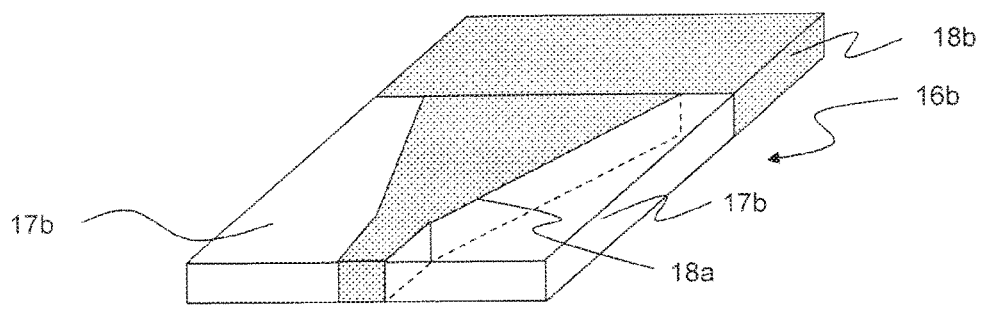
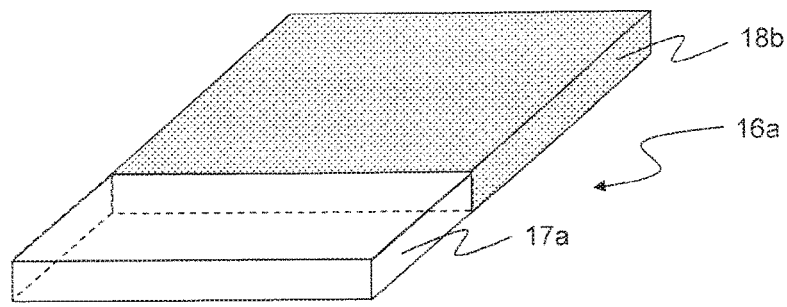
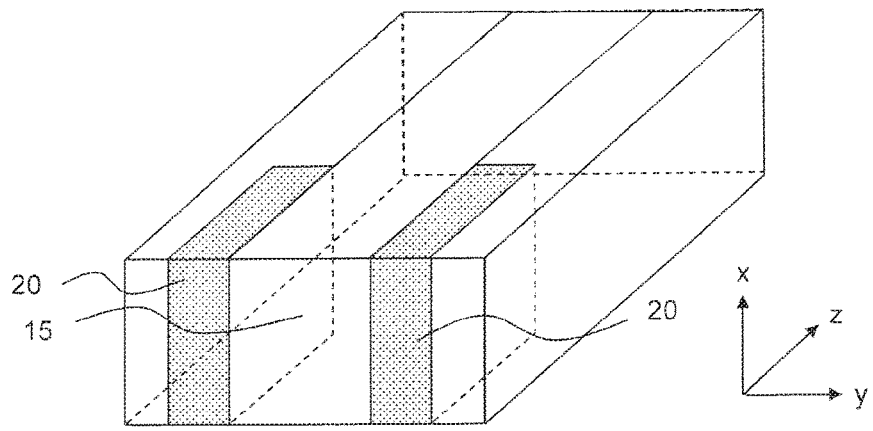

Fig. 9
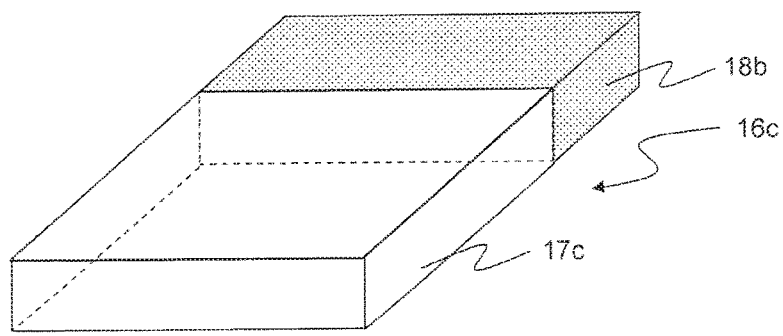
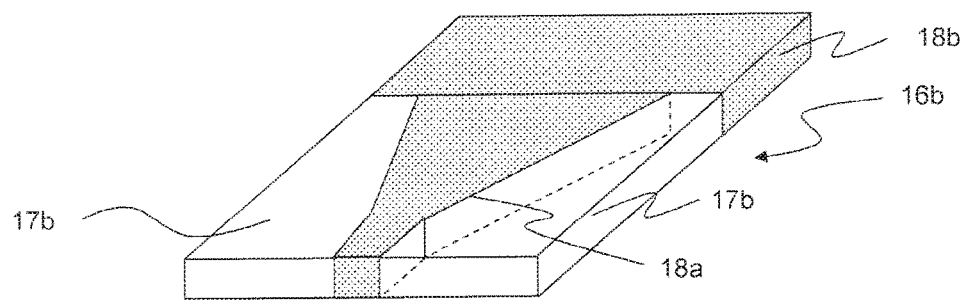
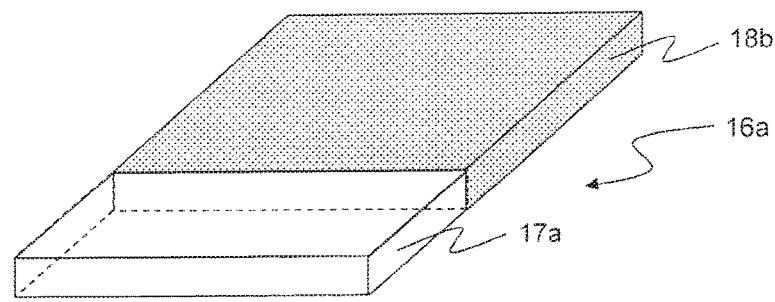
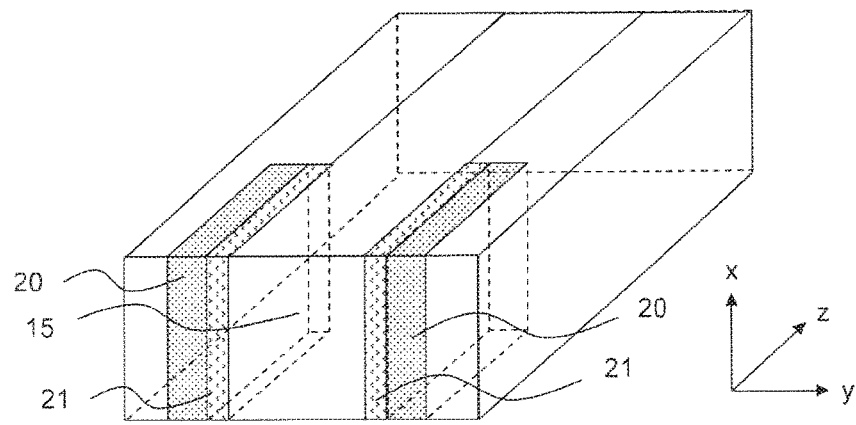

Fig. 10
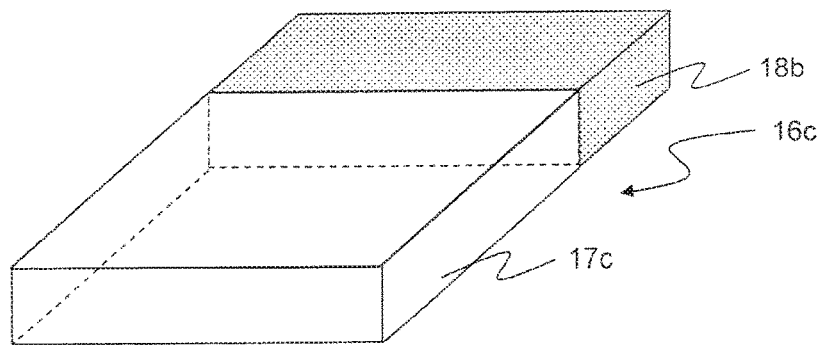
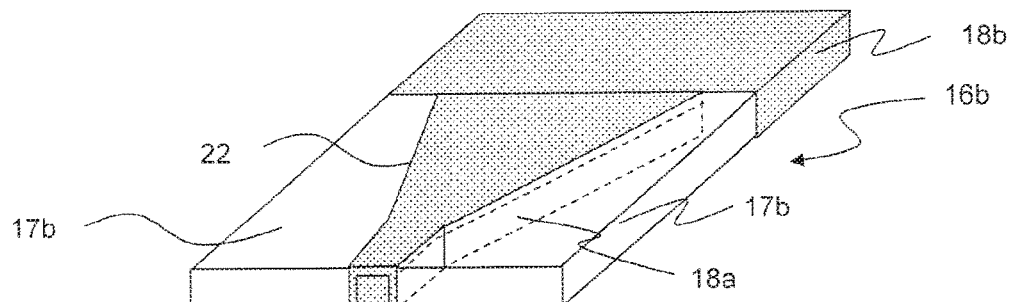
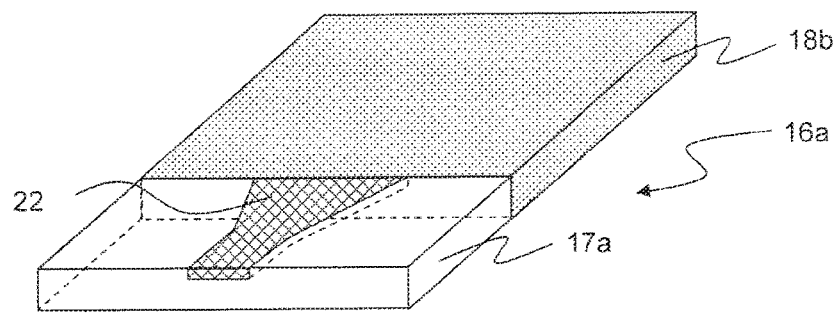
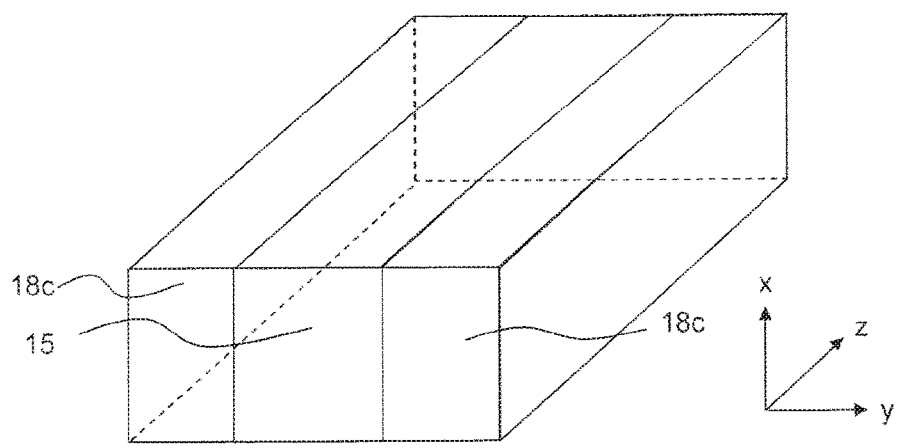

Fig. 13
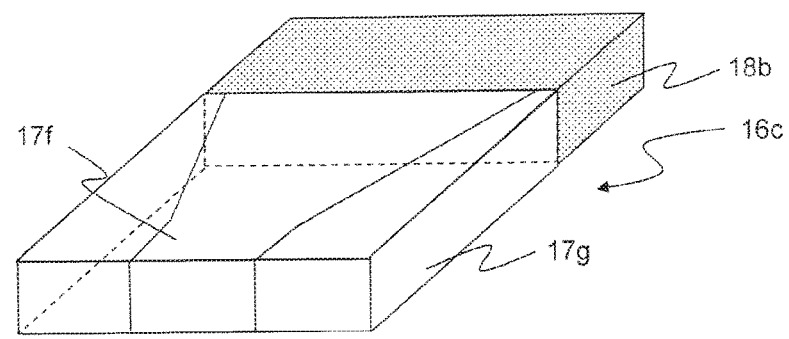
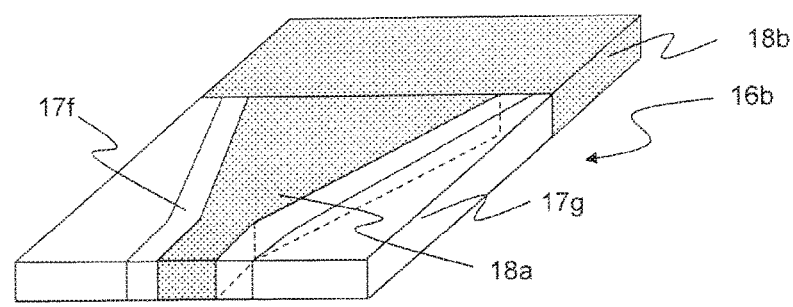
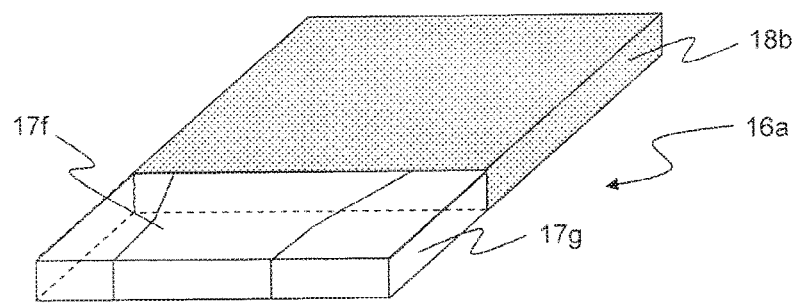
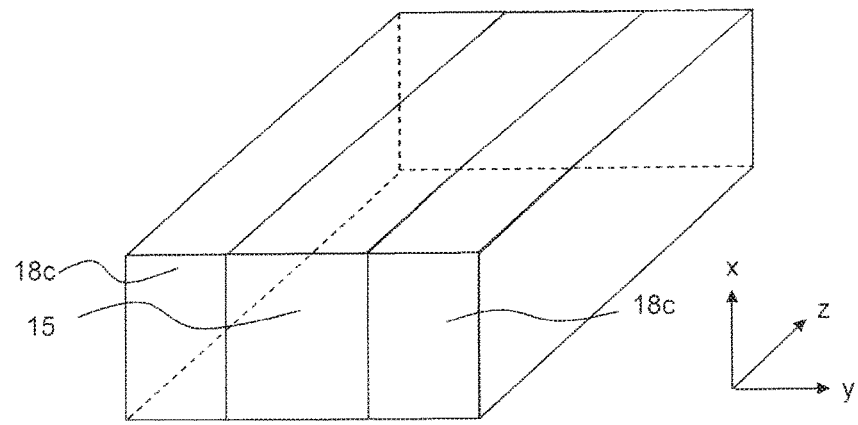

THERMALLY ASSISTED MAGNETIC RECORDING HEAD HAVING PLASMON GENERATOR IN WHICH DIELECTRIC LAYER IS SURROUNDED BY METAL LAYER

BACKGROUND OF THE INVENTION

1. Field of the Invention

The present invention relates to a thermally assisted magnetic recording head and particularly relates to a configuration of a plasmon generator in the thermally assisted magnetic recording head.

2. Description of the Related Art

Recently, in a magnetic recording apparatus typified by a magnetic disk apparatus, improvements of performance of a thin film head and a magnetic recording medium have been sought in association with high recording density. As the thin film magnetic head, a composite type thin film magnetic head has been widely used in which a reproducing head having a magnetoresistive effect element (MR element) for reading and a recording head with an induction-type electromagnetic transducer element for writing are laminated on a substrate.

The magnetic recording medium is a discontinuous medium where magnetic grains aggregate, and each magnetic grain has a single magnetic domain structure. Each recording bit on the magnetic recording medium is composed of a plurality of magnetic grains. To increase the recording density, roughness of a boundary between recording bits that are adjacent to each other has to be diminished by reducing the size of the magnetic grains. However, if the size of the magnetic grains is reduced, there is a problem that the thermal stability of magnetization of the magnetic grains is reduced in association with the reduction of the volume of the magnetic grains. In order to eliminate this problem, it is effective to increase the anisotropic energy of the magnetic grains. However, the increased anisotropic energy of the magnetic grains increases the coercive force of a magnetic recording medium, and this makes it difficult to record information with existing magnetic heads.

As a method to solve this problem, a so-called thermally assisted magnetic recording has been proposed. With this method, a magnetic recording medium with great coercive force can be used. When information is recorded, simultaneous application of a magnetic field and heat to a portion where the information is recorded in the magnetic recording medium increases the temperature in that portion. Consequently, the information is recorded with the magnetic field into that portion where the coercive force has been reduced. Hereafter, a magnetic head that is used for the thermally assisted magnetic recording is referred to as a thermally assisted magnetic recording head (TAMR head).

A typical TAMR is equipped with a core, which propagates light radiated from a laser diode, and a plasmon generator, which generates near-field light (NF light). The plasmon generator is coupled with a portion of the propagated light that propagates in the core in the surface-plasmon mode to generate surface plasmons. The plasmon generator progates the surface plasmons to a front end surface positioned at an air bearing surface (ABS) and generates NF light on the front end surface.

A near-field light generator element (NF light generator) in which two surfaces of a triangular prism-shaped magnetic layer, which is made of a magnetic material, such as FeCo or NiFe, are coated with a nonmagnetic metal layer, such as Au or Ag, is disclosed in U.S. Pat. Nos. 8,233,358 and 8,503,271. A boundary of the two surfaces coated with the nonmagnetic metal layer faces a waveguide. Surface plasmons are generated at this boundary and propagate to the air-bearing surface (ABS) along the boundary. NF light is generated at the end portion of the nonmagnetic metal layer at the ABS side and is radiated to a magnetic recording medium.

In order to increase the recording density, it is desirable to reduce a range to be heated on the magnetic recording medium. For this purpose, it is necessary to locally radiate the NF light to a place where recording is conducted on the magnetic recording medium. In the NF light generator element described in the patent literature above, a generation area of the NF light depends upon the shape of the nonmagnetic metal layer on the ABS. However, since the shape of the nonmagnetic metal layer is complicated, it is difficult to narrow the generation area of the NF light. Consequently, the temperature of the relatively wide range of the magnetic recording medium becomes too high, which interferes with higher recording density.

The objective of the present invention is to provide a thermally assisted magnetic recording head that enables reduction of a heating range of a magnetic recording medium by irradiation of NF light.

SUMMARY OF THE INVENTION

The thermally assisted magnetic recording head of the present invention has a waveguide that propagates laser light as propagating light; a main pole that has a first end portion on an air bearing surface (ABS) facing a magnetic recording medium and that emits a magnetic flux to the magnetic recording medium; a metal layer that is positioned between the main pole and the waveguide, that extends from a second end portion positioned on the ABS in a height direction, that generates a surface plasmon from the propagating light, and that generates near field light (NF light) from the surface plasmons at the second end portion; and a dielectric body layer that is surrounded by the metal layer and that extends from a third end portion positioned on the ABS in the height direction.

The metal layer generates NF light from the surface plasmons at the second end portion and irradiates the NF light to the magnetic recording medium. The surface plasmons are generated mainly along a boundary portion between the waveguide and the metal layer (hereafter, referred to as a first boundary portion) and another boundary portion between the metal layer and a dielectric body layer (hereafter, referred to as a second boundary portion) and propagate toward the magnetic recording medium. In particular, a portion of the first boundary portion and a portion of the second boundary portion facing the first boundary portion becomes a region where the NF light is concentrated by the propagating surface plasmons along these boundary portions. This region has substantially the same cross-track-direction width as the second boundary portion. In other words, in the present invention, the generation area of the NF light is determined by the shape of the dielectric body layer. Consequently, it is easy to reduce a heating range of the magnetic recording medium by irradiation of the NF light.

The above and other objectives, the characteristics, advantage of the present invention, will be apparent from the following explanation with reference to the attached drawings exemplifying the present invention.

BRIEF DESCRIPTION OF THE DRAWINGS

FIGS. 7 to 13 show variations similar to FIG. 5, respectively;

DETAILED DESCRIPTION OF THE INVENTION

Figure 1:
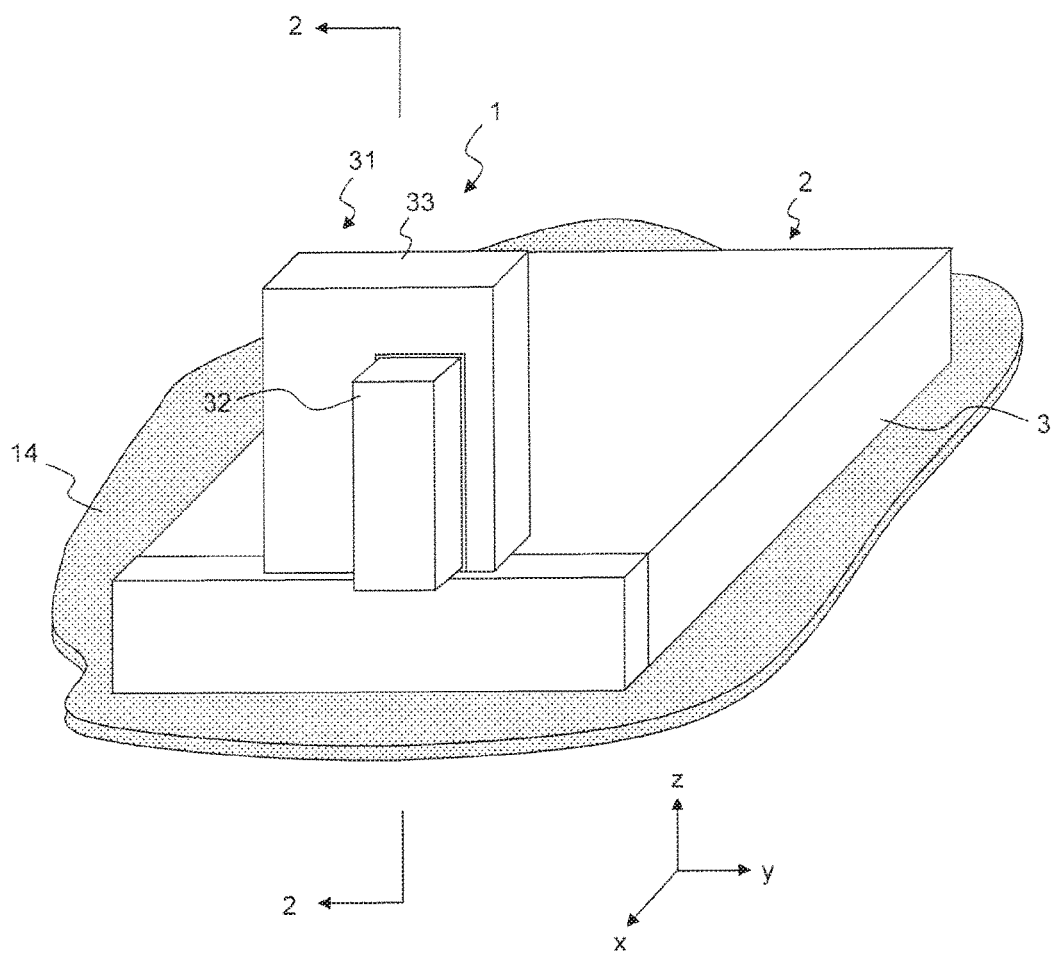
FIG. 1 is an overall perspective view of a thermally assisted magnetic recording head.
Figure 2:
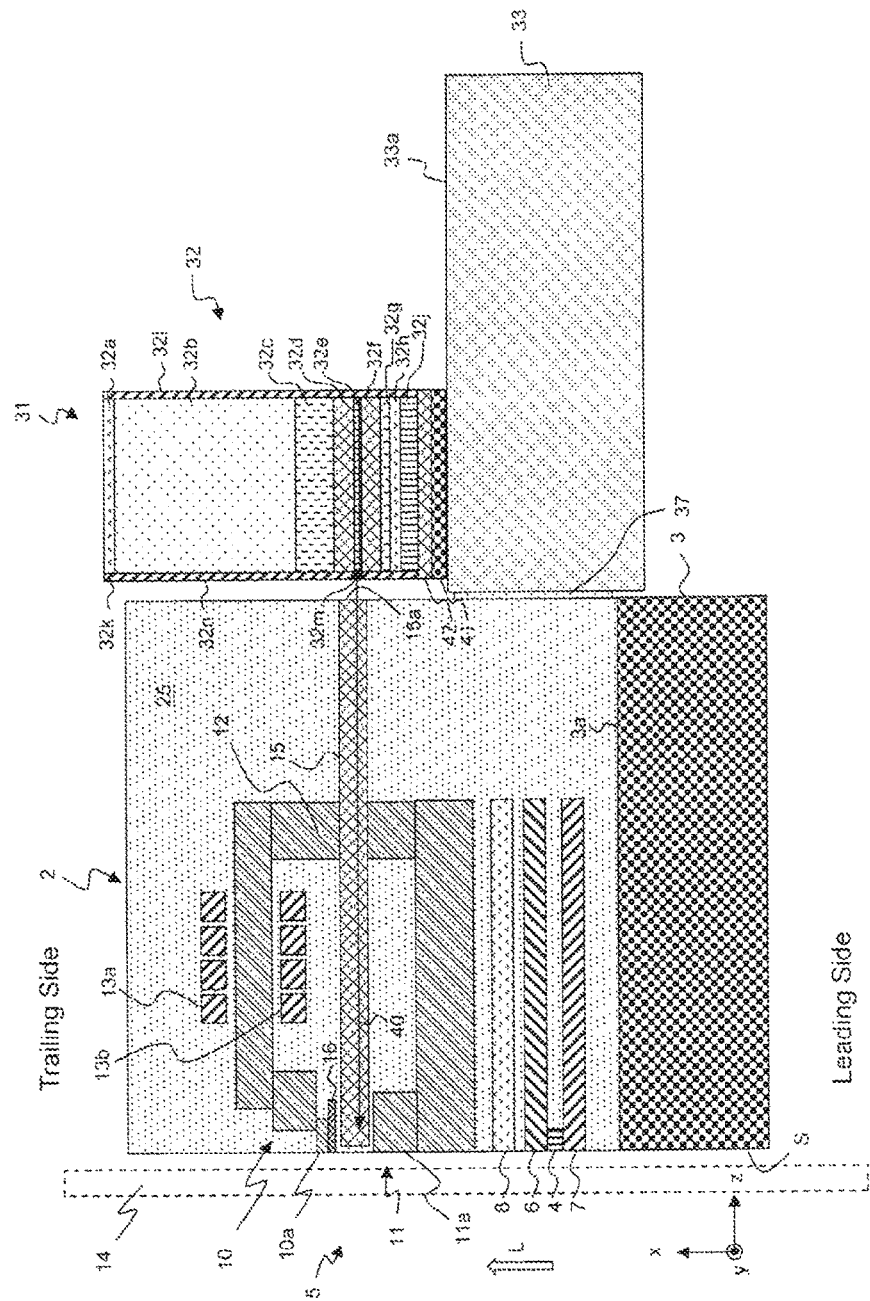
FIG. 2 is a conceptual cross-sectional view of a thermally assisted magnetic recording head relating to one embodiment of the present invention.

First, configuration of the thermally assisted magnetic recording head (hereafter, referred to as the "magnetic head") relating to one embodiment of the present invention will be described. FIG. 1 is an overall perspective view of the magnetic head. FIG. 2 is an overall cross sectional view of the magnetic head cut along a line 2-2 in FIG. 1.

In the present specification, the x-direction refers to a down-track direction, which is a direction that is orthogonal to a principle plane 3a of a substrate 3 where a magneto-resistive (MR) element, a magnetic recording element and the like are formed and corresponds to a circumferential direction of the magnetic recording medium. The y-direction refers to a cross-track direction of the magnetic recording medium and corresponds to a radial direction of the magnetic recording medium. The z-direction refers to a height direction that is orthogonal to an air bearing surface S of a magnetic head slider. The x-direction is matched with a film formation direction L in a wafer process. The x-direction, the y-direction and the z-direction are orthogonal to each other, "Upper side" and "lower side" refer to directions away from a substrate and towards the substrate, in the x-direction, respectively. "Trailing side" may be used instead of "upper side", and "leading side" may be used instead of "lower side".

A magnetic head 1 has a magnetic head slider 2 and a laser diode unit 31, which is fixed to a magnetic head slider 2 and emits laser light.

The magnetic head slider 2 has a substantially hexahedral shape, one surface of which composes the air bearing surface S facing a magnetic recording medium 14. The magnetic head slider 2 has an MR element 4, a magnetic recording element 5, a waveguide 15, which enables propagation of laser light emitted from the laser diode unit 31 as propagating light 40, and a plasmon generator 16 that generates NF light from the propagating light 40 on the air bearing surface S. These elements are formed on the substrate 3 made from AlTiC ($Al_2O_3$—TiC).

The magnetic recording element 5 has a main pole 10 for perpendicular magnetic recording that has a face on the air bearing surface S. The main pole 10 is adjacent to the plasmon generator 16. A portion of the main pole 10 protrudes toward the leading side and contacts the plasmon generator 16. This contact enables transfer of heat generated at the plasmon generator 16 to the main pole 10. A first end portion 10a, which is front edge portion of the main pole 10, is positioned on the air bearing surface S and generates a recording magnetic field on the air bearing surface S. A leading shield 11 is placed at the leading side of the main pole 10 in the down-track direction x. The leading shield 11 is magnetically coupled with the main pole 10 via a contact part 12 and constitutes an integral magnetic circuit along with the main pole 10. The leading shield 11 has a shield end surface 11a on the air bearing surface S. Coils 13a and 13b are wound near the main pole 10 centering upon the contact part 12. The main pole 10, the leading shield 11 and the contact part 12 are formed with an alloy of two or three of Ni, Fe and Co or the like. An overcoat layer 25 made of $Al_2O_3$ is placed above the magnetic recording element 5 in the x-direction.

A magnetic flux generated within the main pole 10 is emitted from the first end portion 10a toward the magnetic recording medium 14 as a magnetic flux for writing. The magnetic flux emitted from the first end portion 10a enters into the magnetic recording medium 14 and magnetizes each recording bit in a perpendicular direction z. The magnetic flux changes its magnetic path to an in-plane direction (x-direction) of the magnetic recording medium 14, further changes its orientation to the perpendicular direction (z-direction) again in the vicinity of the leading shield 11, and is absorbed by the leading shield 11 from the shield end surface 11a.

The waveguide 15 is positioned at the leading side of the plasmon generator 16. The waveguide 15 extends in the z-direction. The waveguide 15 propagates the laser light generated by the laser diode unit 31 as propagating light in the z-direction. The waveguide 15 extends from an end portion 15a (incident end surface of the laser light) of the magnetic head slider 2 facing the laser diode unit 31 to the vicinity of the air bearing surface S. It is preferable to form the waveguide 15 with a dielectric body having a greater refractive index, and for example, it can be formed with TaOx. TaOx means tantalum oxide with any formula, and $Ta_2O_5$, TaO, $TaO_2$ and the like are typical, but not limited to these. The waveguide 15 can be formed with $ZrO_2$ or $Nb_2O_5$ as well. The width of the waveguide 15 in the cross-track direction y is approximately 100 nm to 300 nm on the air bearing surface S. The width of the waveguide 15 in the cross-track direction y may be reduced toward the air bearing surface S.

The magnetic head slider 2 has the MR element 4 where its front edge portion is positioned on the air bearing surface S, and an upper-side shield layer 6 and a lower-side shield layer 7 placed at both sides in the x-direction of the MR element 4. The MR element 4 is a reproducing element that reads information recorded in a magnetic recording medium and can be any of a Current-In-Plane (CIP)-Gigantic-Magneto-Resistive (GMR) element, in which a sense current flows in the y-direction, a Current-Perpendicular-to-Plane (CPP)-GMR element, in which a sense current flows in the x-direction, and a Tunneling-Magneto-Resistive (TMR) element, in which a sense current flows in the x-direction and that utilizes a tunnel effect. When the MR element 4 is the CPP-GMR element or the TMR element, the upper-side shield layer 6 and the lower-side shield layer 7 are utilized as electrodes supplying a sense current. A magnetic shield layer 8 is placed between the MR element 4 and the magnetic recording element 5.

Figure 3:
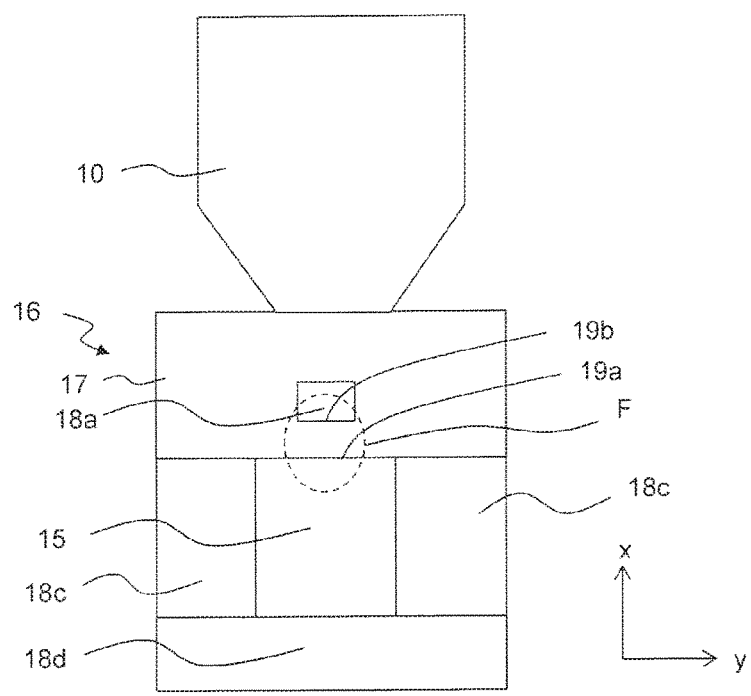
FIG. 3 is a side view of main parts of a magnetic recording element on an air bearing surface (ABS)
Figure 4:
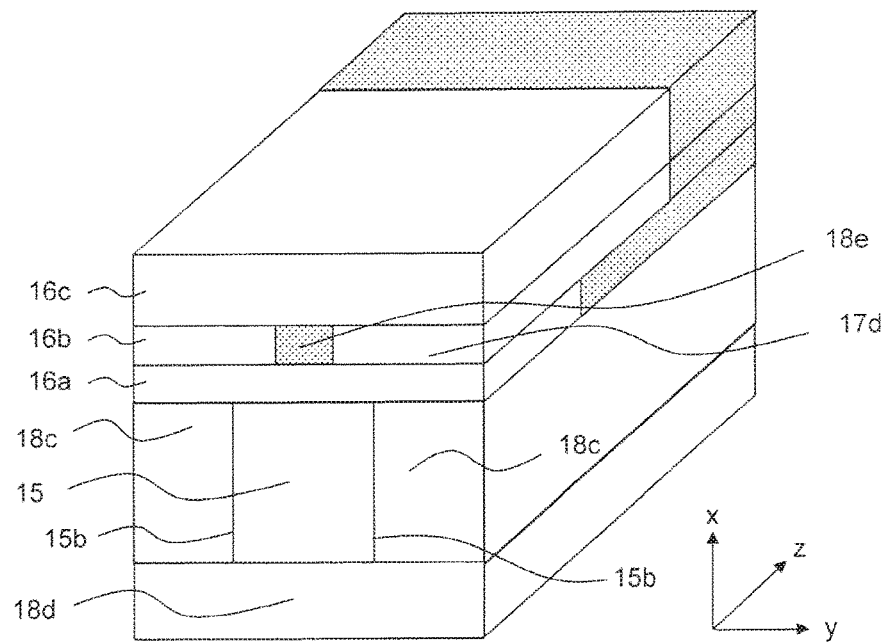
FIG. 4 is a conceptual view of a waveguide and a plasmon generator.
Figure 5:
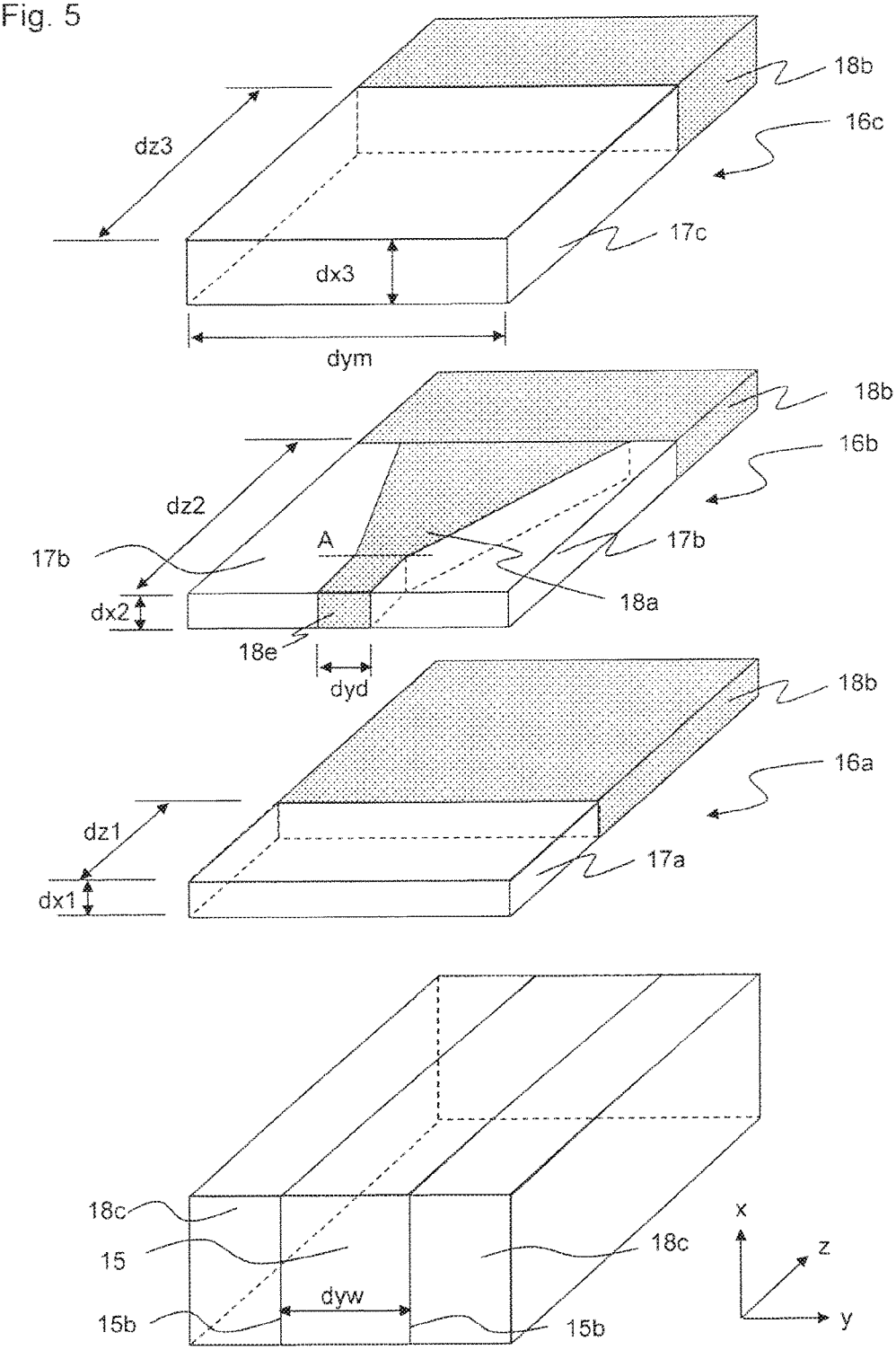
FIG. 5 is an exploded perspective view of FIG. 4.

FIG. 3 shows main parts of the magnetic recording element 5 on the air bearing surface S. FIG. 4 is a schematic perspective view of the waveguide 15 and the plasmon generator 16. FIG. 5 is an exploded perspective view of FIG. 4. In FIG. 5, illustration of a fourth dielectric body layer 18d is omitted.

The plasmon generator 16 is positioned between the main pole 10 and the waveguide 15 and extends in the height direction z. The plasmon generator 16 has a metal layer 17 and a dielectric body layer 18a surrounded by the metal layer 17. The plasmon generator 16 is sectioned by first layer 16a facing the waveguide 15, a third layer 16c facing the main pole 10 and a second layer 16b positioned between the first layer 16a and the third layer 16c. The first to third layers 16a to 16c correspond to a manufacturing process of the magnetic head slider 2. In other words, after the waveguide 15 is formed, the first to third layers 16a to 16c are formed in respective order, and then, the main pole 10 is formed.

The metal layer 17 extends from the second end portion 17d positioned on the air bearing surface S in the height direction. The metal layer 17 generates surface plasmons from the propagating light 40 and generates NF light from the surface plasmons at the second end portion 17d. The metal layer 17 contacts the main pole 10, but a dielectric body layer may be placed between the metal layer 17 and the main pole 10. The metal layer 17 is composed of a first portion 17a positioned in a first layer 16a, a second portion 17b positioned in a second layer 16b and a third portion 17c positioned in a third layer 16c. The height-direction length of a portion opposing the main pole 10 of the metal layer 17 is greater than that of a portion opposing the waveguide 15. In other words, the height-direction length dz3 of the third portion 17c is longer than the height-direction length dz1 of the first portion 17a. With this design, NF light can be further narrowed down. It is preferable that the height-direction length dz3 of the third portion 17c is equal to or more than 0.25 μm and equal to or less than the height-direction length of the main pole 10, and it is preferable that the height-direction length dz1 of the first portion 17a is between 0.15 to 1.1 μm. The height-direction length dz2 of the second portion 17b is the same as the height-direction length dz3 of the third portion 17c.

Although the metal layer 17 is made of Au, it can be made from Ir, Pd, Pt, Rh, Ru, Ag, Cu, Al, Ta, Zr, Ni or Fe, as well. The metal layer 17 may be made of an alloy of Au, such as $AuCo_3$, and may be made of an alloy of Ir, Pd, Pt, Rh, Ru, Ag, Cu, Al, Ta, Zr, Ni or Fe. Formation of the metal layer 17 with Au or an alloy of Au enables improvement of the generating efficiency of NF light. On the other hand, since the hardness of Rh or Ir or alloys thereof is greater than that of Au or an alloy of Au, the characteristics of the plasmon generator 16 can be maintained throughout a long period of time.

A first dielectric body layer 18a is placed in the center of the second portion 17b in the cross-track direction y. The first dielectric body layer 18a extends from a third end portion 18e, which is positioned on the air bearing surface S, in the height direction. The height-direction length of the first dielectric body layer 18a is the same as that of the second portion 17b of the metal layer 17. Therefore, the second portion 17b is divided into two by the first dielectric body layer 18a. As a result, the metal layer 17 surrounds the first dielectric body layer 18a within the range of the height-direction length dz1 of the first portion 17a. In other words, the dielectric body layer 18a is surrounded by or embedded into the metal layer 17.

The first dielectric body layer 18a is made from a dielectric body, such as MgO, $Al_2O_3$, $SiO_2$ or $Ta_2O_5$. The first dielectric body layer 18a has a rectangular cross section at an arbitrary position in the height direction z including the air bearing surface S. The cross-track-direction length (width) of the first dielectric body layer 18a decreases toward the portion A in FIG. 5 from the connection part with the second dielectric body layer 18b substantially in the same ratio and is further reduced from the portion A toward the air bearing surface S in a smaller ratio (or, although not illustrated, in the same ratio or a greater ratio). Therefore, the cross-track-direction length of the first dielectric body layer 18a becomes the shortest on the air bearing surface S, and this enables efficient narrowing of the NF light. The cross-sectional shape of the first dielectric body layer 18a may be trapezoidal such that the waveguide 15 side is a long side and the main pole 10 side is a short side and, in general, the shape is quadrilateral with parallel sides in the cross-track direction.

The second dielectric body layer 18b is placed on the back side of the metal layer 17 and the first dielectric body layer 18a as viewed from the air bearing surface S. Since the second dielectric body layer 18b also functions as the cladding of the waveguide 15, it is formed with a dielectric body, such as $Al_2O_3$ or $SiO_2$, having a lower refractive index than the waveguide 15. The second dielectric body layer 18b can be integrally formed with the first dielectric body layer 18a as well. Further, the second dielectric body layer 18b can be formed with different dielectric bodies from each other in the first to third layers 16a to 16c as well. In order to simplify the manufacturing process, the second dielectric body layer 18b in the second layer 16b can be formed with the same material as that of the first dielectric body layer 18a in the second layer 16b. The second dielectric body layers in the first and third layers 16a and 16c are similar.

A third dielectric body layer 18c is placed at both sides of the waveguide 15 in the cross-track direction. A fourth dielectric body layer 18d is placed on the opposite surface of a surface contacting the metal layer 17 of the waveguide 15. Since the third dielectric body layer 18c and the fourth dielectric body layer 18d also function as the cladding of the waveguide 15, respectively, these are formed with a dielectric body having a lower refractive index than the waveguide 15, for example, a dielectric body, such as $Al_2O_3$ or $SiO_2$.

With reference to FIG. 3, in the plasmon generator 16 in the present embodiment, surface plasmons generated from the propagating light 40 propagating in the waveguide 15 are mainly generated along a first boundary portion 19a between the waveguide 15 and the metal layer 17 and along a boundary portion between the metal layer 17 and the first dielectric body layer 18a. The surface plasmons propagate toward the magnetic recording medium 14. In particular, in a region F, since NF light is generated from both surface plasmons propagated along the first boundary part 19a and a second boundary part 19b facing the boundary portion 19a of the boundary portion between the metal layer 17 and the first dielectric body layer 18a, this will be a region where NF light is concentrated. The region F has a cross-track-direction width that is approximately equal to that of the second boundary portion 19b. A center of the region F, i.e., a region where the strongest NF light is radiated, is between the dielectric body layer 18a and the waveguide 15. The size of the region F is determined mainly with the cross-track-direction width of the second boundary part 19b in the first dielectric body layer 18a. Since the first dielectric body layer 18a has the simple shape as described above and since limitations during the manufacturing process are few, size reduction is easy. Thus, in the present embodiment, the generation area F of NF light can be narrowed down, and the heating range of the magnetic recording medium 14 can be reduced.

The NF light can be further narrowed down by reducing the cross-track-direction width of the first dielectric body layer 18a. However, if the width of the first dielectric body layer 18a is too narrow, plasmons cannot be sufficiently generated, so an optimum shape of the third end portion 18e of the first dielectric body layer 18a exists. With reference to FIG. 5, for the third end portion 18e of the first dielectric body layer 18a, it is preferable that the dimension dyd in the cross-track direction y is 35 nm to 50 nm, and the dimension dx2 in the down-track direction x (thickness of the second layer 16b) is 10 nm to 15 nm or 12.5 to 20 nm when the dielectric body layer 18a is $SiO_2$ or $Al_2O_3$, respectively.

It is preferable that the first dielectric body layer 18a is close to the waveguide 15. In other words, it is preferable that a distance (thickness of the first layer 16a) dx1 between the third end portion 18e of the first dielectric body layer 18a and the end surface of the metal layer 17 at the waveguide 15 side is small. Due to this design, the generation area of the surface plasmons along the first boundary portion 19a can be certainly defined. The distance dx1 is preferably 7.5 nm to 10 nm. On the other hand, it is desirable that the first dielectric body layer 18a is away from the main pole 10. In other words, it is preferable that the distance between the third end portion 18e of the first dielectric body layer 18a and the end surface of the metal layer 17 at the main pole 10 side (thickness of the third layer 16c) dx3 is greater. With this design, the main pole 10 is distanced from the plasmon generation surface and the NF generation area, and heat generation at the main pole 10 by absorbing light can be prevented. The distance dx3 is preferably 20 nm or greater. Furthermore, dx1 is not necessarily smaller than dx3. If the first dielectric body layer 18a is separated from the main pole 10, because a region where a magnetic flux is emitted on the magnetic recording medium 14 and another region to be heated are separated, it is preferable that an upper limit value for dx3 is 100 nm to 200 nm.

The dimension dym of the metal layer 17 in the cross-track-direction y is preferably greater than the dimension dyw of the waveguide 15 in the cross-track direction y at least on the air bearing surface S, and, more preferably, is greater than the dimension dyw of the waveguide 15 in the cross-track direction y throughout the entire length in the height direction z. It is further preferable that the metal layer 17 covers the waveguide 15 throughout the entire length in the height direction z when viewed in the down-track direction x. When the dimension dym of the metal layer 17 in the cross-track direction y is small, a case where NF light cannot be efficiently narrowed down occurs. For example, when a thin metal layer covers the first dielectric body layer 18a, surface plasmons are generated on an outer surface of the metal layer, and NF light is generated in a region surrounded by the metal layer. Consequently, it becomes difficult to narrow the generation area of NF light. However, the outer surface of the metal layer 17 is distanced from the waveguide 15 by increasing the dimension dym of the metal layer 17 in the cross-track direction y. Consequently, it becomes difficult for surface plasmons to be generated on the outer surface of the metal layer 17, and plasmons are generated preferentially along the first boundary portion 19a between the metal layer 17 and the waveguide 15 and along a boundary between the metal layer 17 and the first dielectric body layer 18a. It is desirable that the metal layer 17 extends beyond the end surfaces 15b at both sides of the waveguide 15 in the cross-track direction y when viewed from the center of the waveguide 15 in the cross-track direction y, at least on the air bearing surface S. For example, when the cross-track direction-length of the waveguide 15 is 200 nm, it is desirable that the cross-track-direction length dym of the metal layer 17 is 500 nm or greater.

Since the dimension dym of the metal layer 17 in the cross-track direction y is greater than the dimension dyw of the waveguide 15 in the cross-track direction y, the metal layer 17 of the plasmon generator 16 in the present embodiment has a greater volume than that of a conventional plasmon generator. By increasing the volume of the metal layer 17, the thermal capacity of the metal layer 17 increases, and for example, it is possible to prevent a temperature increase of the metal layer 17 due to part of the propagating light 40 and the surface plasmons being transformed into heat. This improves the long-term reliability of the plasmon generator 16, and it leads to improvement of the life span of the magnetic head.

With reference to FIG. 2 again, the laser diode unit 31 is positioned to face a surface opposite to the air bearing surface S of the magnetic head slider 2. The laser diode unit 31 emits laser light in the direction z that is perpendicular to the air bearing surface S toward the waveguide 15 of the magnetic head slider 2. The laser diode unit 31 is soldered to the magnetic head slider 2 by using an adhesion layer 37.

The laser diode unit 31 is equipped with a laser diode 32, which is a laser light generating element and a sub-mount 33 for mounting the laser diode 32. The laser diode 32 supplies laser light to the waveguide 15. The sub-mount 33 is made from Si substrate or the like. The laser diode 32 is mounted to a mounting surface 33a of the sub-mount 33. Specifically, a first electrode (p-electrode) 32j of the laser diode 32 is fixed to a pad 41 placed on the mounting surface 33a of the sub-mount 33 with a soldering material 42.

The laser diode 32 is an edge-emitting type and can be of a type normally used for communication, optical system disk storage or material analysis, such as InP-series, GaAs-series or GaN-series. Although the wavelength of the laser light to be radiated is not particularly limited, wavelengths within a range of 375 nm to 1.7 μm are usable, and particularly, a wavelength of approximately 650 nm to 900 nm is preferably used.

The laser diode 32 is not limited to the configuration below, but one example is a configuration where an n-electrode 32a constituting a second electrode, an n-GaAs substrate 32b, an n-InGaAlP cladding layer 2c, a first InGaAlP guide layer 32d, an active layer 32e made from a multi-quantum well (InGaP/InGaAlP) and the like, a second InGaAlP guide layer 32f, a p-InGaAlP cladding layer 32g, a p-electrode under layer 32h and a p-electrode 32j constituting a first electrode are sequentially laminated. Reflective layers 32k and 32l for exciting oscillation by total reflection are formed in front of and in back of a cleavage surface of the laser diode 32. A surface of the reflective layer 32k, i.e., a surface facing the magnetic head slider 2 of the laser diode 32, constitutes a light-emitting surface 32n of the laser diode 32. An emission center 32m exists at a position of the active layer 32e of the reflective layer 32k. The n-electrode 32a and the p-electrode 32j can be formed with Au or Au alloy with approximately 0.1 μm of thickness. When a hard disk device is operated, power is fed to the laser diode 32 from a power source within the hard disk device via the first electrode 32j and the second electrode 32a.

Figure 6:
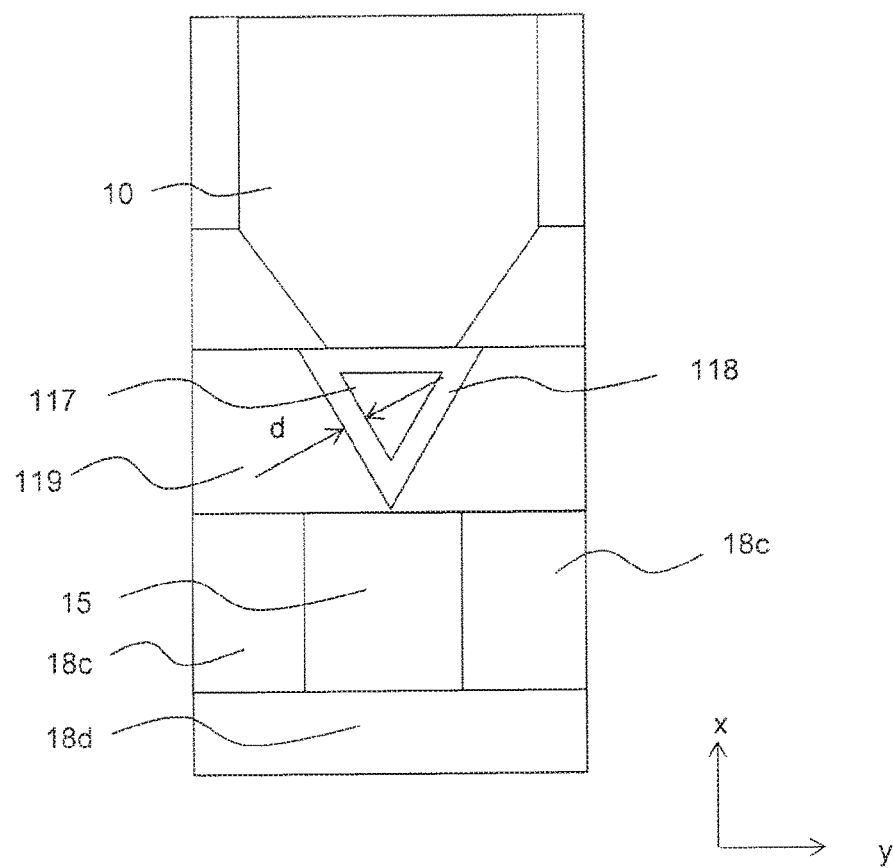
FIG. 6 is a side view of main parts of a magnetic recording element in a reference example.

In order to confirm the effect of the present embodiment, a simulation was conducted. Here, for the metal layer 17, AuCo3 was used. FIG. 6 shows a side view of the air bearing surface S of the thermally assisted magnetic head in the reference examples. In the reference examples, the shape of the metal layer and that of the dielectric body are different from those in the present embodiment. For both Reference Examples 1 and 2, a triangular prism-shaped dielectric body 117 is embedded into a triangular prism-shaped AuCo3 layer 118. Outside of the AuCo3 layer 118 is another dielectric body layer 119. The thickness d of the AuCo3 layer 118 was set at 10 nm in Reference Example 1 and 100 nm in Reference Example 2. Take an example having the layer configuration like that shown in FIGS. 3 to 5 and with dyd=40 nm, dym=17 μm, dx1=10 nm, dx2=12.5 nm and dx3=30 nm. The temperature distribution of a magnetic recording medium was obtained, and the full width at half maximum (FWHM) of the temperature distribution was calculated. The FWHM is an interval between two points at a half value of the highest temperature on a straight line that passes through a highest temperature point of the magnetic recording medium and parallel to the cross-track direction y. The smaller the FWHM value is, the greater the temperature gradient is, and the heating range is narrowed. The FWHM in Reference Example 1 was 0.097 μm, that in Reference Example 2 was 0.230 μm, and that in the example was 0.072 μm. With this setting, it was confirmed that the FWHM in the example was improved by approximately 25% compared to Reference Example 1.

Further, the values for the temperature gradient in the down-track direction x (DT-TG: Down-track Thermal Gradient) at a write point (a point closest to the trailing side in the region where data is written into the magnetic recording medium) and the maximum value of the temperature gradient in a cross-track direction y (CT-TG: Cross-Track Thermal Gradient) on a line intersecting the maximum temperature point on the magnetic recording medium in the cross-track direction, were calculated using a uniquely-determined calculation method. Here, the temperature gradients in the down-track direction x and the cross-track direction y are a temperature change per unit length in the down-track direction x and the cross-track direction y of the magnetic recording medium, respectively. If DT-TG and CT-TG are great, it becomes possible to locally heat a smaller range of the magnetic recording medium, DT-TG at the write point is 15.52 K/nm in the example, 9.42 K/nm in Reference Example 1 and 4.03 K/nm in Reference Example 2; and the maximum value of CT-TG on the line intersecting the maximum temperature point on the magnetic recording medium in the cross-track direction was 11.05 K/nm in the example, 7.90 K/nm in Reference Example 1 and 4.35 K/nm in Reference Example 2. Thus, it was confirmed that the temperature gradients in the down-track direction x and the cross-track direction y were increased.

Further, values of the temperature at the write point on the magnetic recording medium divided by the highest temperature of the metal layer 17 (M/H) were compared. When the magnetic recording medium is sufficiently heated, if the temperature of the metal layer 17 is low, since it is believed that it would lead to the life span extension of the magnetic head, a greater M/H is more desirable. M/H was 2.53 in the example, 0.159 in Reference Example 1, and 0.946 in Reference Example 2, and improvement of M/H was confirmed.

FIGS. 7 to 13 show various modifications of the plasmon generator 16 as similar to FIG. 5.

Figure 7:
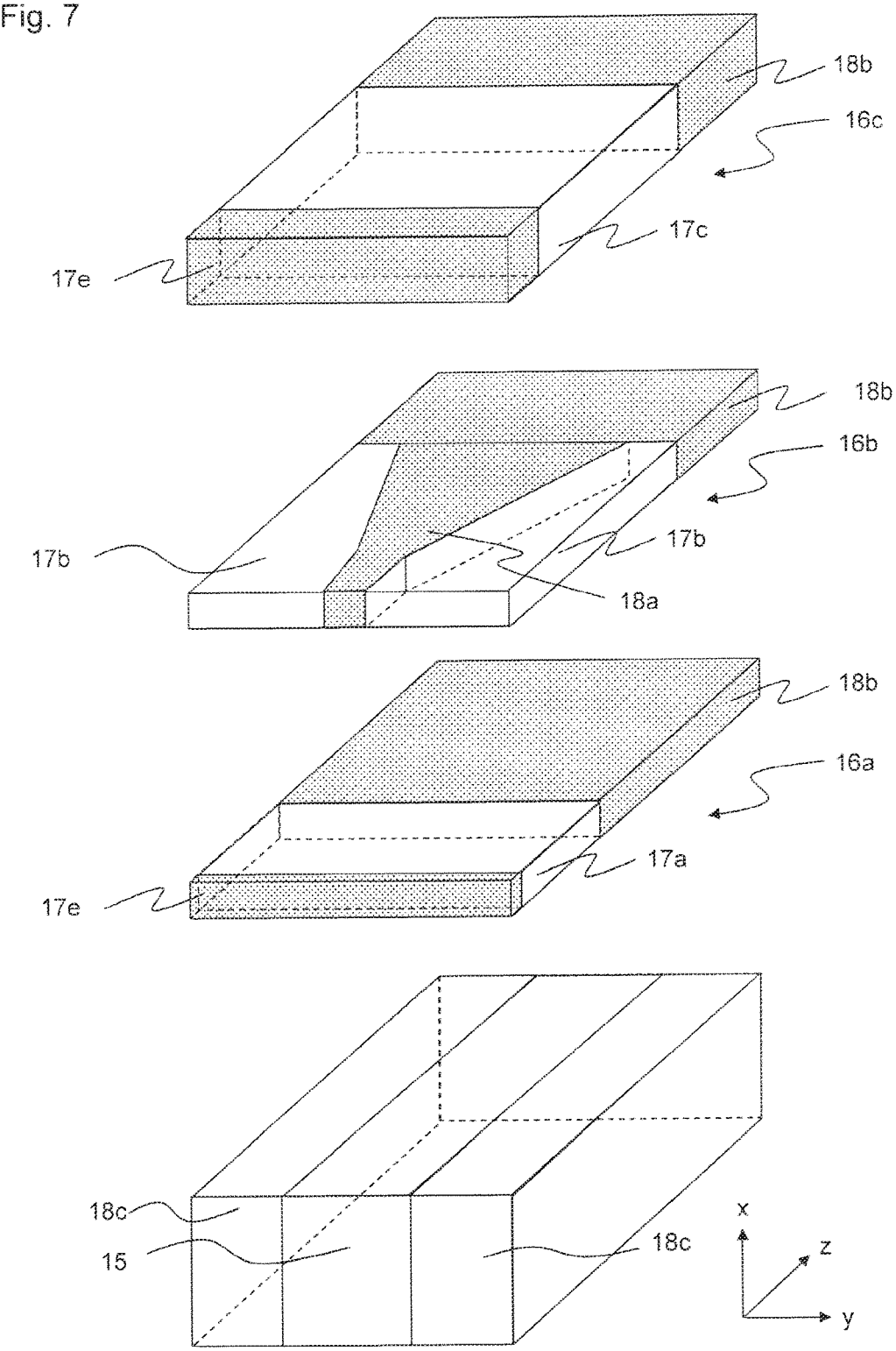

With reference to FIG. 7, a portion of the metal layer 17 facing the air bearing surface S is substituted by an Ir layer 17e. In FIG. 7, the portion facing the air bearing surface S is partially substituted, but it can be substituted so as to allow the entire surface of the portion facing the air bearing surface S to be the Ir layer. Since Ir has higher hardness compared to Au, while NF light is effectively generated, agglomeration of the front edge portion of the metal layer 17 can be inhibited. Consequently, in the present variation, life span extension of the magnetic head can be accomplished. Instead of Ir, Pd, Pt, Rh, Ru, Ag, Cu, Al, Ta, Zr, Ni, Fe or Ir, and alloys thereof can be used.

With reference to FIG. 8, side metal layers 20 are included at both sides of the waveguide 15 in the cross-track direction y. The side metal layers 20 are formed from Au. The side metal layers 20 may be formed from an Au alloy, such as AuCo3. The length of the side metal layers 20 in the height direction is the same as the height-direction length dz1 of a first part 17a, but these are not necessarily the same. According to the present variation, the temperature gradients of the magnetic recording medium can be increased. DT-TG at the write point was 18.36 K/nm and the maximum value of CT-TG on the line intersecting the maximum temperature point on the magnetic recording medium in the cross-track direction was 14.32 K/nm, and these were further increased compared to the embodiment above.

With reference to FIG. 9, intermediate dielectric body layers 21 are placed between the waveguide 15 and the side metal layers 20 in the variation shown in FIG. 8, respectively. The intermediate dielectric body layers 21 are made of $Al_2O_3$ or $SiO_2$. In the present variation, a degree of the increase in the temperature gradients of the magnetic recording medium is smaller than that in the variation shown in FIG. 8, but a temperature increase of the metal layer 17 can be suppressed.

With reference to FIG. 10, an adhesion layer 22 is placed between the first dielectric body layer 18a and the metal layer 17. Although the adhesion layer 22 is formed on all side surfaces of the first dielectric body layer 18a, it can be formed only on some side surfaces, as well. The adhesion layer 22 is formed with metal, such as Pt, Ta or Zr, or a dielectric body, such as IrOx or NiOx. The adhesion layer 22 improves a degree of adhesion between the first dielectric body layer 18a and the metal layer 17, and life span extension of the magnetic head can be accomplished.

Figure 11:
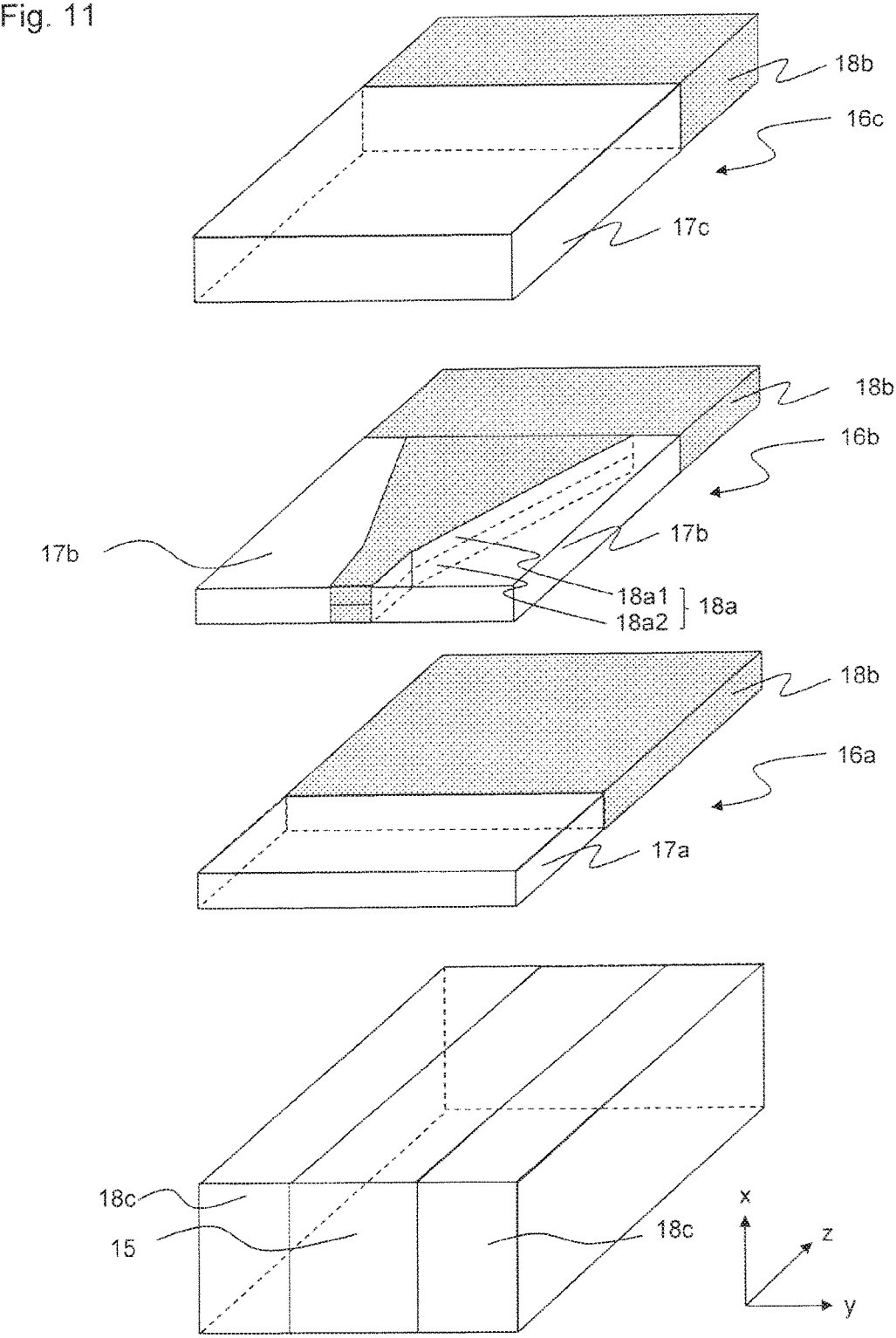

With reference to FIG. 11, the first dielectric body layer 18a is composed of an $SiO_2$ layer 18a1 and an $Al_2O_3$ layer 18a2 laminated in the down-track direction x. In the present variation, a temperature increase of the metal layer 17 can be suppressed. Even though either one of the $SiO_2$ layer 18a1 and the $Al_2O_3$ layer 18a2 is situated at the upper side, an effect to suppress a temperature increase of the metal layer 17 can be obtained compared to the first dielectric body layer 18a only made of $Al_2O_3$, but if the $SiO_2$ layer 18a1 is situated at the lower side, the effect to suppress the temperature rise of the metal layer 17 is greater (M/H is higher). DT-TG and CT-TG become higher when $Al_2O_3$ is situated at the lower side.

Figure 12:
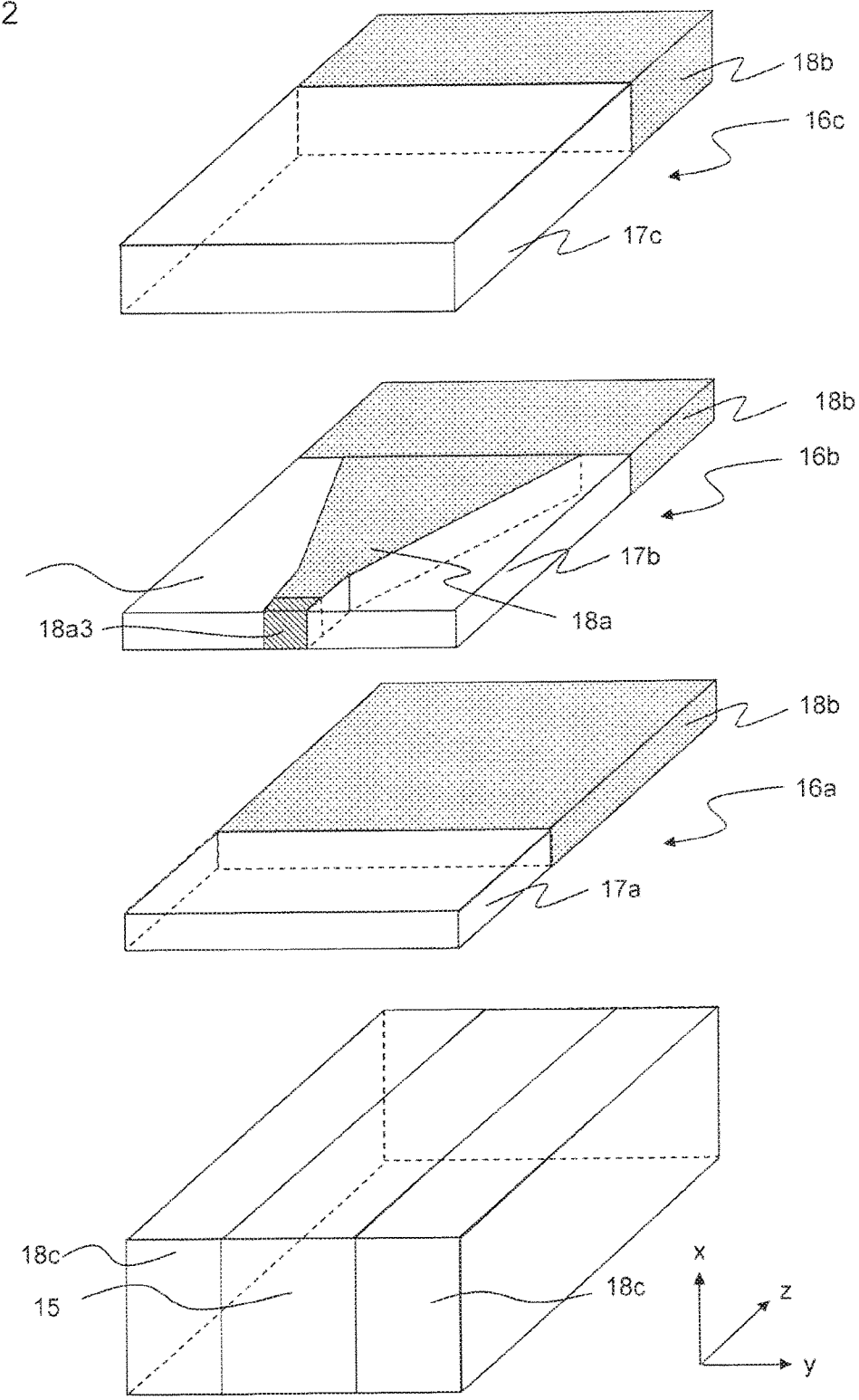

With reference to FIG. 12, the first dielectric body layer 18a has a MgO surface 18a3 at the air bearing surface S. According to the present variation, the temperature gradients of the magnetic recording medium can be increased.

With reference to FIG. 13, the metal layer 17 has a layer 17f that surrounds the first dielectric body layer 18a, and that is made of Au or an alloy thereof, and a layer 17g that surrounds 17f, and that is made of Ir, Pd, Pt, Rh, Ru, Ag, Cu, Al, Ta, Zr, Ni or Fe. The layer 17g does not have to completely surround the layer 17*f*, but it can partially surround the layer 17*f*. Further, the layer 17*g* faces the air bearing surface S. Consequently, an area of the layer 17*f* made of Au or alloy thereof that is exposed to the air bearing surface S can be limited. Au or alloy thereof is soft, and a tolerance for polishing process or the like in a posterior process is small. In the present embodiment, since a portion of Au or alloy thereof exposed to the air bearing surface S is replaced by Ir, Pd, Pt, Rh, Ru, Ag, Cu, Al, Ta, Zr, Ni or Fe, damage to the metal layer 17 can be reduced. Furthermore, although an angle of the boundary between the layer 17*f* and the layer 17*g* relative to the z-direction is changed half way through, it can be extended linearly.

In addition, although illustration is omitted, in each embodiment mentioned above, the second dielectric body layer 18*b* can be a two-layer configuration. Further, another dielectric body layer can be inserted into a portion of the second dielectric body layer 18*b*.

Next, a head gimbal assembly where a magnetic head is mounted is explained.

Figure 14:
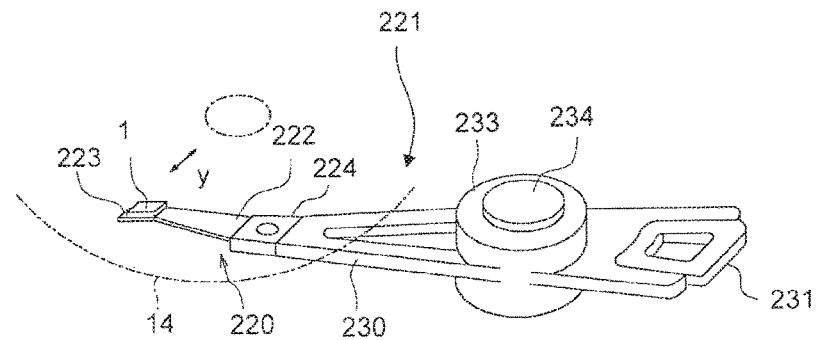
FIG. 14 is a perspective view of a head arm assembly of the present invention.

With reference to FIG. 14, a head gimbal assembly 220 is equipped with the magnetic head 1 and a suspension 221 that elastically supports the magnetic head 1. The suspension 221 has a plate spring-state load beam 222 made from stainless steel, a flexure 223 placed at one end of the load beam 222, and a base plate 224 placed at the other end of the load beam 222. The magnetic head 1 is joined to the flexure 223, and an appropriate degree of freedom is provided to the magnetic head 1. A gimbal part for stabilizing the attitude of the magnetic head 1 is mounted to a portion of the flexure 223 where the magnetic head 1 is attached.

Figure 15:
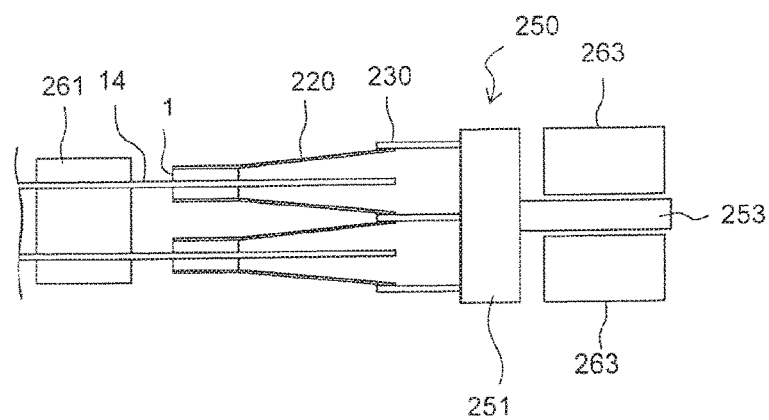
FIG. 15 is a side view of a head stack assembly of the present invention.
Figure 16:
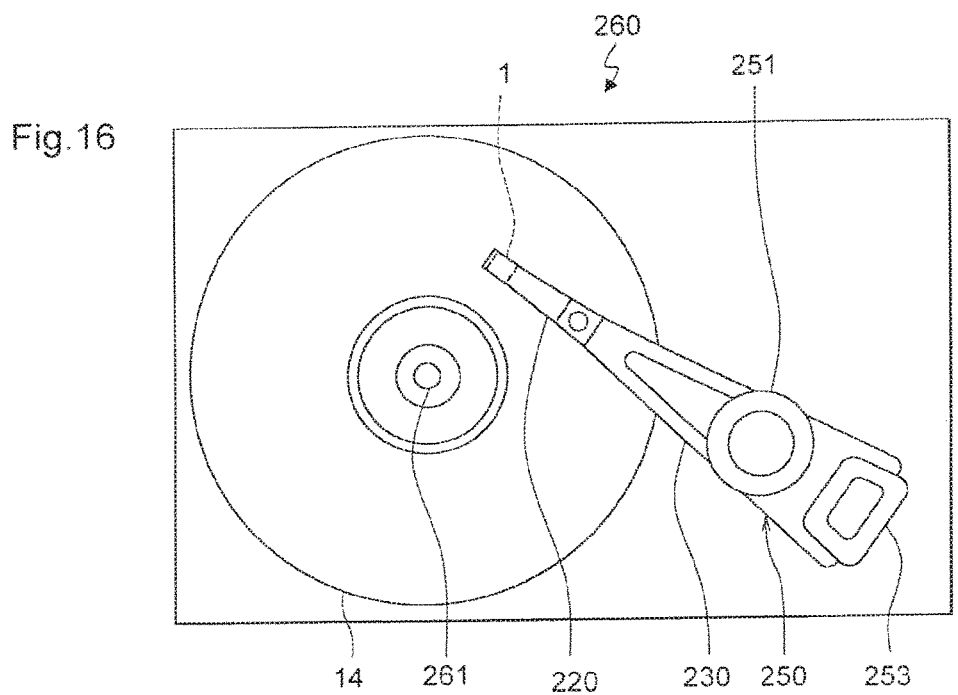
FIG. 16 is a plan view of a magnetic recording apparatus of the present invention.

The head gimbal assembly 220 attached to an arm 230 is referred to as a head arm assembly 221. The arm 230 moves the magnetic head 1 in the cross-track direction y of the magnetic recording medium 14. One end of the arm 230 is mounted to a base plate 224, A coil 231 to be a portion of a voice coil motor is mounted to the other end of the arm 230. A bearing part 233 is placed in the intermediate part of the arm 230. The arm 230 is rotatably supported by a shaft 234 mounted to the bearing part 233. The arm 230 and the voice coil motor that drives the arm 230 constitute an actuator, Next, with reference to FIG. 15 and FIG. 16, a head stack assembly where the magnetic head 1 explained above is incorporated and a magnetic recording apparatus are explained. The head stack assembly is an assembly in which head gimbal assemblies 220 are mounted to the arms of a carriage having a plurality of arms, respectively. FIG. 15 is a side view of the head stack assembly, and FIG. 16 is a plan view of the magnetic recording apparatus. A head stack assembly 250 has a carriage 251 having a plurality of arms 230. The head gimbal assemblies 220 are mounted to the arms 230 to be aligned in a perpendicular direction at intervals from each other, respectively. A coil 253, which is a part of the voice coil motor, is mounted to the carriage 251 at the other side of the arm 230. The voice coil motor has permanent magnets 263 arranged at positions facing each other across the coil 253.

With reference to FIG. 15, the head stack assembly 250 is incorporated into a magnetic recording apparatus 260. The magnetic recording apparatus 260 has a plurality of magnetic recording media 14 mounted to a spindle motor 261. Two magnetic heads 1 are arranged to be opposite from each other across the magnetic recording medium 14 in every magnetic recording medium 14. The head stack assembly 250 excluding the magnetic heads 1 and an actuator correspond to a positioning device that supports the magnetic heads 1 and positions the magnetic heads 1 relative to the magnetic recording media 14. The magnetic heads 1 are moved by the actuator in the cross-track direction y of the magnetic recording media 14 and are positioned relative to the magnetic recording media 14. The magnetic heads 1 record information to the magnetic recording media 14 by the magnetic recording element 5 and reproduce the information recorded in the magnetic recording media 14 by the MR element 4.

The preferred embodiments of the present invention were presented and were explained in detail, but it should be understood that the present invention can be variously modified and amended without departing from the concept or the scope of the attached claims.

What is claimed is:

1. A thermally assisted magnetic recording head, comprising:
   a waveguide that propagates laser light as propagating light,
   a main pole that includes a first end portion on an air bearing surface (ABS) facing a magnetic recording medium and that emits a magnetic flux to the magnetic recording medium,
   a metal layer that is positioned between the main pole and the waveguide, that extends from a second end portion positioned on the ABS in a height direction, that generates surface plasmons from the propagating light, and that generates near-field light (NF light) from the surface plasmons at the second end portion, and
   a dielectric body layer that is surrounded on both sides of the dielectric body layer in a down-track direction by the metal layer and that extends from a third end portion positioned on the ABS in a height direction, wherein a dimension of the metal layer in a cross-track direction is greater than that of the waveguide in the cross-track direction on the ABS.

2. The thermally assisted magnetic recording head according to claim 1, wherein the metal layer extends beyond end surfaces at both sides of the waveguide in the cross-track direction on the air bearing surface when viewed from the center of the waveguide in the cross-track direction.

3. The thermally assisted magnetic recording head according to claim 1, further comprising side metal layers at both sides of the waveguide in a cross-track direction.

4. A thermally assisted magnetic recording head, comprising:
   a waveguide that propagates laser light as propagating light,
   a main pole that includes a first end portion on an air bearing surface (ABS) facing a magnetic recording medium and that emits a magnetic flux to the magnetic recording medium,
   a metal layer that is positioned between the main pole and the waveguide, that extends from a second end portion positioned on the ABS in a height direction, that generates surface plasmons from the propagating light, and that generates near-field light (NF light) from the surface plasmons at the second end portion, and
   a dielectric body layer that is surrounded on both sides of the dielectric body layer in a down-track direction by the metal layer and that extends from a third end portion positioned on the ABS in a height direction, wherein the metal layer covers the waveguide throughout the entire metal layer length in the height direction when viewed from the down-track direction.

5. A thermally assisted magnetic recording head, comprising:

a waveguide that propagates laser light as propagating light, a main pole that includes a first end portion on an air bearing surface (ABS) facing a magnetic recording medium and that emits a magnetic flux to the magnetic recording medium, a metal layer that is positioned between the main pole and the waveguide, that extends from a second end portion positioned on the ABS in a height direction, that generates surface plasmons from the propagating light, and that generates near-field light (NF light) from the surface plasmons at the second end portion, and a dielectric body layer that is surrounded on both sides of the dielectric body layer in a down-track direction by the metal layer and that extends from a third end portion positioned on the ABS in a height direction, wherein a gap between the dielectric body layer and the waveguide in the down-track direction is 7.5 nm to 10 nm.

6. A thermally assisted magnetic recording head, comprising:

a waveguide that propagates laser light as propagating light, a main pole that includes a first end portion on an air bearing surface (ABS) facing a magnetic recording medium and that emits a magnetic flux to the magnetic recording medium, a metal layer that is positioned between the main pole and the waveguide, that extends from a second end portion positioned on the ABS in a height direction, that generates surface plasmons from the propagating light, and that generates near-field light (NF light) from the surface plasmons at the second end portion, and a dielectric body layer that is surrounded on both sides of the dielectric body layer in a down-track direction by the metal layer and that extends from a third end portion positioned on the ABS in a height direction, wherein the dielectric body layer is surrounded on both sides of the dielectric body layer in a cross-track direction by the metal layer.

7. The thermally assisted magnetic recording head according to claim 6, wherein the metal layer has a larger dimension than the waveguide in a cross-track direction at any location of the metal layer in the down-track direction.

8. A thermally assisted magnetic recording head, comprising:

a waveguide that propagates laser light as propagating light, a main pole that includes a first end portion on an air bearing surface (ABS) facing a magnetic recording medium and that emits a magnetic flux to the magnetic recording medium, a metal layer that is positioned between the main pole and the waveguide, that extends from a second end portion positioned on the ABS in a height direction, that generates surface plasmons from the propagating light, and that generates near-field light (NF light) from the surface plasmons at the second end portion, and a dielectric body layer that is surrounded on both sides of the dielectric body layer in a down-track direction by the metal layer and that extends from a third end portion positioned on the ABS in a height direction, wherein the metal layer has a larger dimension than the waveguide in a cross-track direction at any location of the metal layer in the down-track direction.

* * * * *